(12) United States Patent
Spenninger et al.

(10) Patent No.: US 12,280,507 B2
(45) Date of Patent: Apr. 22, 2025

(54) GENERATING A CONTROL PROGRAM FOR A ROBOT MANIPULATOR

(71) Applicant: Franka Emika GmbH, Munich (DE)

(72) Inventors: Andreas Spenninger, Karlsfeld (DE); Jose Ramon Medina Hernandez, Munich (DE)

(73) Assignee: Franka Emika GmbH, Munich (DE)

( * ) Notice: Subject to any disclaimer, the term of this patent is extended or adjusted under 35 U.S.C. 154(b) by 153 days.

(21) Appl. No.: 17/784,916

(22) PCT Filed: Dec. 22, 2020

(86) PCT No.: PCT/EP2020/087557
§ 371 (c)(1),
(2) Date: Jun. 13, 2022

(87) PCT Pub. No.: WO2021/130193
PCT Pub. Date: Jul. 1, 2021

(65) Prior Publication Data
US 2023/0001580 A1 Jan. 5, 2023

(30) Foreign Application Priority Data
Dec. 27, 2019 (DE) ..................... 10 2019 135 810.8

(51) Int. Cl.
*B25J 9/16* (2006.01)
*B25J 13/08* (2006.01)

(52) U.S. Cl.
CPC ............. *B25J 9/1664* (2013.01); *B25J 9/161* (2013.01); *B25J 13/085* (2013.01); *B25J 13/088* (2013.01);
(Continued)

(58) Field of Classification Search
CPC ............ G05B 2219/40599; G05B 2219/40607
See application file for complete search history.

(56) References Cited

U.S. PATENT DOCUMENTS 9,186,795 B1 * 11/2015 Edsinger .............. B25J 11/0065
2011/0125321 A1 * 5/2011 Finkemeyer ........... B25J 9/1602
901/50
(Continued)

FOREIGN PATENT DOCUMENTS

| CN | 104552300 A | 4/2015 |
|---|---|---|
| CN | 106775807 A | 5/2017 |

(Continued)

OTHER PUBLICATIONS

English-language translation of International Preliminary Report on Patentability issued in International Application No. PCT/EP2020/087557 on Jul. 7, 2022.
(Continued)

*Primary Examiner* — Jaime Figueroa
*Assistant Examiner* — Jerrod Irvin Davis
(74) *Attorney, Agent, or Firm* — Hoffmann & Baron, LLP

(57) ABSTRACT

A method of generating a control program, wherein the method includes: executing an application by the first robot manipulator, at the same time, determining trajectory data and/or wrench data, determining robot commands from a stored time series, the robot commands being principal elements of the control program for the robot manipulator without relation to design conditions of a first robot manipulator, and generating the control program for a second robot manipulator based on the stored robot commands and based on the design conditions of the second robot manipulator.

18 Claims, 1 Drawing Sheet

(52) U.S. Cl.
CPC .............. *G05B 2219/40599* (2013.01); *G05B 2219/40607* (2013.01)

(56) References Cited

U.S. PATENT DOCUMENTS

| | | |
|---|---|---|
| 2014/0114478 A1 | 4/2014 | William et al. |
| 2015/0290795 A1 | 10/2015 | Oleynik |
| 2019/0232488 A1* | 8/2019 | Levine .................... B25J 9/161 |
| 2019/0314989 A1 | 10/2019 | Sokabe et al. |
| 2020/0061818 A1 | 2/2020 | Schwinge |
| 2020/0070346 A1* | 3/2020 | Oaki ....................... B25J 9/1664 |
| 2021/0110089 A1* | 4/2021 | Chen ..................... G06T 7/0004 |
| 2024/0131695 A1 | 4/2024 | Levine et al. |

FOREIGN PATENT DOCUMENTS

| | | |
|---|---|---|
| CN | 106938470 A | 7/2017 |
| CN | 109906132 A | 6/2019 |
| DE | 202008014481 U1 | 2/2009 |
| DE | 102010029745 A1 | 12/2011 |
| DE | 212013000217 U1 | 12/2015 |
| DE | 202017105598 U1 | 7/2018 |
| DE | 202019101831 U1 | 6/2019 |
| DE | 102018214417 B3 | 7/2019 |
| EP | 2055446 A1 | 5/2009 |
| EP | 3528070 A1 | 8/2019 |
| JP | 2019188561 A * | 10/2019 |
| JP | 6705977 B2 | 5/2020 |
| KR | 10-2012-0005082 A | 1/2012 |
| KR | 10-2016-0124770 A | 10/2016 |
| KR | 10-2019-0040506 A | 4/2019 |

OTHER PUBLICATIONS

Perez-D'Arpino, Claudia, et al. "C-LEARN: Learning geometric constraints from demonstrations for multi-step manipulation in shared autonomy", 2017 IEEE International Conference on Robotics and Automation (ICRA), IEEE, May 29, 2017, pp. 4058-4065.

Costa, Luis Feliphe S., et al. "Online Learning and Teaching of Emergent Behaviors in Multi-Robot Teams", IEEE Access, vol. 7, Nov. 7, 2019, pp. 158989-159001.

Peternel, Luka, et al., "Robots learning from robots: A proof of concept study for co-manipulation tasks", 2017, IEEE-RAS 17th International Conference on Humanoid Robotics (Humanoids), IEEE, Nov. 15, 2017, pp. 484-490.

* cited by examiner

GENERATING A CONTROL PROGRAM FOR A ROBOT MANIPULATOR

CROSS-REFERENCE TO RELATED APPLICATIONS

The present application is the U.S. National Phase of PCT/EP2020/087557, filed on 22 Dec. 2020, which claims priority to German Patent Application No. 10 2019 135 810.8, filed on 27 Dec. 2019, the entire contents of which are incorporated herein by reference.

BACKGROUND

Field

The invention relates to a method for generating a control program for a second robot manipulator based on empirical data from executing a predetermined application by a first robot manipulator, and to a robot system having a first control unit and a second control unit for performing the method.

SUMMARY

It is the object of the invention to simplify the generation of a control program for executing a task by a robot manipulator.

The invention results from the features of the independent claims. Advantageous developments and embodiments are the subject of the dependent claims.

A first aspect of the invention relates to a method of generating a control program for a second robot manipulator based on empirical data from executing a predetermined application by a first robot manipulator, the method including:
  executing the predetermined application by the first robot manipulator;
  during execution of the predetermined application:
    obtaining time series of trajectory data by joint angle sensors of the first robot manipulator and/or time series of wrench data by a sensor unit of the first robot manipulator for detecting forces and/or torques, and storing the obtained time series in a storage unit, wherein the trajectory data include kinematic data relating to a reference point of the first robot manipulator or with respect to the joint angles of the first robot manipulator, and wherein the wrench data include forces and/or torques acting between the first robot manipulator and an object in the surroundings;
  determining robot commands from the stored time series and storing the determined robot commands in the storage unit, the robot commands being principal elements of a control program for a respective robot manipulator without reference to the design conditions of the first robot manipulator; and
  generating the control program for the second robot manipulator based on the stored robot commands and based on design conditions of the second robot manipulator.

Furthermore, the next step preferably takes place:
  executing the control program for the second robot manipulator by the second robot manipulator, in particular, by the second control unit of the second robot manipulator.

The first robot manipulator and the second robot manipulator are not necessarily similar or of the same design, but may also have different technical solutions and designs. The first robot manipulator is, in particular, connected to such a (first) control unit, which is designed for executing a first control program in order to execute the predetermined application. This first control program is, in particular, optimized for the first robot manipulator, that is it takes into account the technical conditions and design solutions at the first robot manipulator, so that the application can be executed by the first robot manipulator altogether, whereby the first control program is, in particular, also optimized for the design conditions of the first robot manipulator. All steps of the method according to the first aspect of the invention are preferably carried out by the first control unit. Alternatively, the control program for the second robot manipulator is preferably generated by a second control unit different from the first control unit.

In the first step of the method according to the first aspect of the invention, the predetermined application is executed by the first robot manipulator. Possible applications include, in particular, moving an object from one location to another, merely grasping the object, selecting an object from a plurality of objects, grasping the selected object, processing a surface of a work piece, or other tasks typical of a robot manipulator.

During this execution of the predetermined application by the first robot manipulator, a time series of trajectory data is determined, in particular, by the first control unit. This is performed based on sensor values from joint angle sensors of the first robot manipulator. These joint angle sensors are designed, in particular, to detect and output a respective angle between two links of the first robot manipulator connected to each other by a common joint. In particular, this is performed repeatedly in discrete time steps and at high frequencies so that a time series of discrete joint angle data of the first robot manipulator is available. A pose of the first robot manipulator is thus known throughout all joint angles at each point in time, from which a path curve of a reference point of the first robot manipulator can be determined in Cartesian coordinate systems, in particular, with respect to a first fixed coordinate system.

The reference point of the first robot manipulator is preferably notionally located at a distal end, and more preferably notionally located at an end effector, of the first robot manipulator. The concept of trajectory further includes a path curve, that is, the purely geometric information of a motion, either purely with respect to joint angles or (also) with respect to a Cartesian trajectory of the reference point of the first robot manipulator. Optionally, the concept of trajectory additionally includes time information, so that each location of the geometric path curve is also associated with a time, and a velocity and/or an acceleration of the reference point during the traversal of this geometric path curve are also known via the information of the geometric path curve.

In addition or alternatively to the joint angle information, during this embodiment of the predetermined application, Cartesian information of a path curve or a trajectory based on the joint angle information is detected by the first robot manipulator, as well as, in particular, one or more forces and/or torques acting between the first robot manipulator and an object in the surroundings of the robot manipulator. The latter is performed, in particular, by the sensor unit for detecting forces and/or torques, preferably, torque sensors in the joints or also strain gauges on the robot structure, so that a time series of force-related interactions between the first robot manipulator and the surroundings are recorded.

As a result, kinematic information and/or information regarding a force/torque during the execution of the predetermined application by the first robot manipulator are available. These data are each stored in time series, so that a history of the course of execution of the application is known.

Robot commands are subsequently formed from this information of the time series. Such robot commands provide functional information about how the predetermined application is executed in general, based on how it was executed specifically by the first robot manipulator, regardless of the design conditions of the first robot manipulator. These robot commands thus do not include the conversion via the Jacobian matrix valid for the first robot manipulator or its (pseudo-)inverse, that is, it does not take into account how a movement of an object from a first location to a second location is to be executed specifically by controlling the actuators in relation to each other. The robot commands are therefore abstracted function blocks of a control program, which are to be executed in principle and independently of the architecture of the currently used robot manipulator. They basically therefore correspond to the commands of an outermost loop of a closed-loop control of the respective robot manipulator during the execution of the control program.

Based on this abstracted information, a concrete control program for the second robot manipulator is then generated, wherein the complete control program for the second robot manipulator takes into account the design conditions of the second robot manipulator, in particular, how many joints the second robot manipulator has, whether it is a redundant or a unique second robot manipulator, what type of gripper or generally type of end effector is currently arranged on the second robot manipulator, etc.

It is therefore an advantageous effect of the invention that a control program is provided for the second robot manipulator based on the empirically acquired data during the execution of the application by the first robot manipulator, which control program already contains the functionally essential information in the form of robot commands, and so that further sensors are not required for the second robot manipulator and for the application to be executed by it and its control program, in particular, in order to detect objects in the surroundings of the second robot manipulator, and, generally speaking, to adapt the control program for the second robot manipulator to the current situation. Rather, the execution of the application is based on the provided robot commands, which contain the empirically determined information of the execution of the application by the first robot manipulator. Advantageously, therefore, the generation of the control program for the second robot manipulator is significantly accelerated and simplified, since the latter can draw on information from executions of the applications that have already taken place, irrespective of whether the first robot manipulator is identical in construction to the second robot manipulator, or whether these two differ in terms of construction or configuration or software.

According to an advantageous embodiment, the robot commands include at least one of the following categories:
  a predetermined path curve of a reference point of the respective robot manipulator from a predetermined start point to a predetermined end point of the path curve;
  a velocity of the reference point on the path curve;
  an acceleration of the reference point on the path curve;
  a force and/or a torque that the reference point of the respective robot manipulator exerts on an object in the surroundings of the respective robot manipulator; and
  target torques for rotational actuators of the respective robot manipulator.

According to a further advantageous embodiment, at least two successive robot commands from different categories are determined, wherein a blending transition between the two successive, categorically different robot commands is determined. The blending transition, in particular, causes the selected robot commands to transition to each other in a smooth transition. This corresponds to intuitive human behavior in which, for example, the sense of sight and the sense of touch are combined for haptically and visually coordinated action. For example, a transition from impedance closed-loop control and so-called "visual servoing" (optically guided path) is generated by a smooth function course without jumps as a weighting function.

According to a further advantageous embodiment, the blending transition is performed by a continuous and over the time of the transition time-dependent predetermined function course. Such a continuous function course is, in particular, without jumps and kinks, and in particular, exhibits a strictly monotonically falling or rising progression over the time duration of the transition. Such a function course advantageously provides a particularly smooth transition between the applications of the robot commands.

According to a further advantageous embodiment, the robot commands are determined from the stored time series by nonlinear optimization. Nonlinear optimization, in particular, uses a cost function that reflects the difference between the time series hypothetically performed by the selected commands and the time series actually performed. Such a cost function is then minimized by methods of nonlinear optimization, in particular, gradient-based methods, evolution methods, genetic algorithms, quadratic optimization methods, etc., so that, in particular, those robot commands are selected which, calculated backwards, lead to time series that also correspond to the actual time series. Thus, the best fitting robot commands are selected.

According to a further advantageous embodiment, the robot commands are determined from the stored time series by applying a predetermined artificial neural network, wherein an input variable of the artificial neural network are the stored time series, and an output variable of the artificial neural network is a respective selected one of a plurality of at least structurally predetermined robot commands, wherein parameters of the respective selected one of the predetermined robot commands are adapted based on the stored time series. The advantage of an artificial neural network is the great flexibility and the broad class of functions that can be represented by the artificial neural network.

According to a further advantageous embodiment, the determination of time series of trajectory data is additionally performed by a camera unit. The camera unit is preferably arranged on the robot manipulator itself. Moreover, the camera unit is preferably a stereo camera unit, so that advantageously spatial information about the path curve and/or the trajectory of the reference point of the robot manipulator is acquired by the camera unit. The information from the camera unit is preferably fused with or supplemented to the information from the joint angle sensors.

According to a further advantageous embodiment, the camera unit is an external camera unit. The external camera unit is preferably arranged physically separate from the first robot manipulator on a frame or on another support in the surroundings of the first robot manipulator. Advantageously, information from non-robot sensors is thus also available, which can be optimally supplemented with the robot sensors to form altogether more reliable data sources.

According to a further advantageous embodiment, the design conditions of the first robot manipulator and/or the second robot manipulator include at least one of the following:
- distances between joints of the respective robot manipulator;
- number of joints of the respective robot manipulator;
- maximum torque that can be applied by rotational actuators of the respective robot manipulator;
- type and configuration of an end effector of the respective robot manipulator;
- virtual stiffness of a closed-loop control of the respective robot manipulator, in particular, the stiffness of a virtual spring in the closed-loop control, in particular, impedance closed-loop control;
- material stiffness of links and/or joints of the respective robot manipulator;
- a geometrically maximum possible working space of the respective robot manipulator;
- time constants and/or bandwidths of actuators of the respective robot manipulator;
- safety level and/or current safety configuration and/or residual risk of the respective robot manipulator;
- physical existence and/or configuration of communication interfaces of the respective robot manipulator;
- number of robot arms of the respective robot manipulator; and
- mass and/or inertia of components, in particular links, of the respective robot manipulator.

Another aspect of the invention relates to a robot system including a first control unit and a second control unit which together are used for generating a control program for a second robot manipulator of the robot system based on empirical data from executing a predetermined application by a first robot manipulator of the robot system, wherein the first control unit is designed to control the first robot manipulator to execute the predetermined application, and further is designed to determine time series of trajectory data by joint angle sensors of the first robot manipulator and/or time series of wrench data by a sensor unit of the first robot manipulator during the execution of the predetermined application, and to store the determined time series in a storage unit, wherein the trajectory data include kinematic data relating to a reference point of the first robot manipulator and/or relating to the joint angles of the first robot manipulator, and the wrench data include forces and/or torques acting between the first robot manipulator and an object in the surroundings, and wherein the first control unit is designed to determine robot commands from the stored time series and to store the determined robot commands in the storage unit, wherein the robot commands are principal elements of a control program for a respective robot manipulator without reference to the design conditions of the first robot manipulator, and wherein the second control unit is designed for generating the control program for the second robot manipulator based on the stored robot commands and based on design conditions of the second robot manipulator.

Advantages and preferred further embodiments of the proposed robot system result from an analogous and mutatis mutandis transfer of the explanations made above in connection with the proposed method.

Further advantages, features, and details result from the following description, in which possibly with reference to the drawings—at least one embodiment example is described in detail. Identical, similar, and/or functionally identical parts are referred to using the same reference numerals.

The representations in the figures are schematic and not to scale.

DETAILED DESCRIPTION

Figure 1:
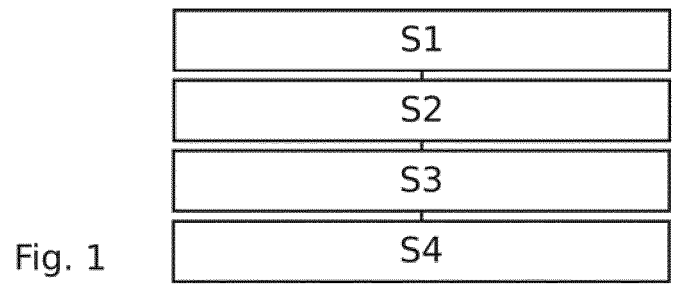
FIG. 1 shows a method of generating a control program for a second robot manipulator based on empirical data from executing a predetermined application by a first robot manipulator according to an example embodiment of the invention.

FIG. 1 shows a method for generating a control program for a second robot manipulator 2 based on empirical data from executing a predetermined application by a first robot manipulator 1. The following description of the method also refers to the robot system 10 of FIG. 2. Therefore, both figures can be referred to for understanding, in particular, also the following mentioned reference signs refer to steps of FIG. 1 as well as optionally to respective operations of FIG. 2. In step S1, the execution of the predetermined application by the first robot manipulator 1 takes place. The application concerns the lifting out of a pointed object from a cylindrical box. For this purpose, a control program for the first robot manipulator 1 is predetermined, which is adapted to the design conditions of the first robot manipulator 1, in particular, to the number of joints, the geometry of the links and the configuration with its gripper.

During the execution of the application, in further step S2, the determination of time series of trajectory data by joint angle sensors 3 of the first robot manipulator 1 and of time series of wrench data by a sensor unit 5 of the first robot manipulator 1 takes place, wherein the joint angle sensors 3 together with the torque sensors of the sensor unit 5 for detecting forces and torques are accommodated in a respective joint of the first robot manipulator 1. These determined time series are stored in a storage unit 7. The trajectory data include data on a path curve with respect to a reference point of the first robot manipulator 1 of the first robot manipulator 1 by transforming the joint angles into a Cartesian position course of the reference point at the end effector of the first robot manipulator 1. On the other hand, the wrench data include the forces and torques acting between the first robot manipulator 1 and the pointed object.

Furthermore, in step S3 the determination of robot commands from the stored time series and the storage of the determined robot commands in the storage unit 7 follows, wherein the robot commands are principal elements of a control program for a respective robot manipulator without reference to the design conditions of the first robot manipulator 1. The composite robot commands include the predetermined path curve of the reference point of the first robot manipulator 1 from the box to a predetermined end point, thereby an acceleration of the reference point on the path curve, and a force and a torque exerted by the end effector at the reference point on the pointed object. These robot commands, when composed, result in a functional sequence of the application that is independent of the aforementioned design conditions of the first robot manipulator 1. The robot commands are determined by applying an artificial neural network in that all the time series are fed to the artificial neural network as input variables and the combination of the robot commands follow as output by execution of the artificial neural network.

This is followed in step S4 by the generation of the control program for the second robot manipulator 2 based on the stored robot commands and based on design conditions of the second robot manipulator 2. Further explanations of these can be found in the description of FIG. 2.

Figure 2:
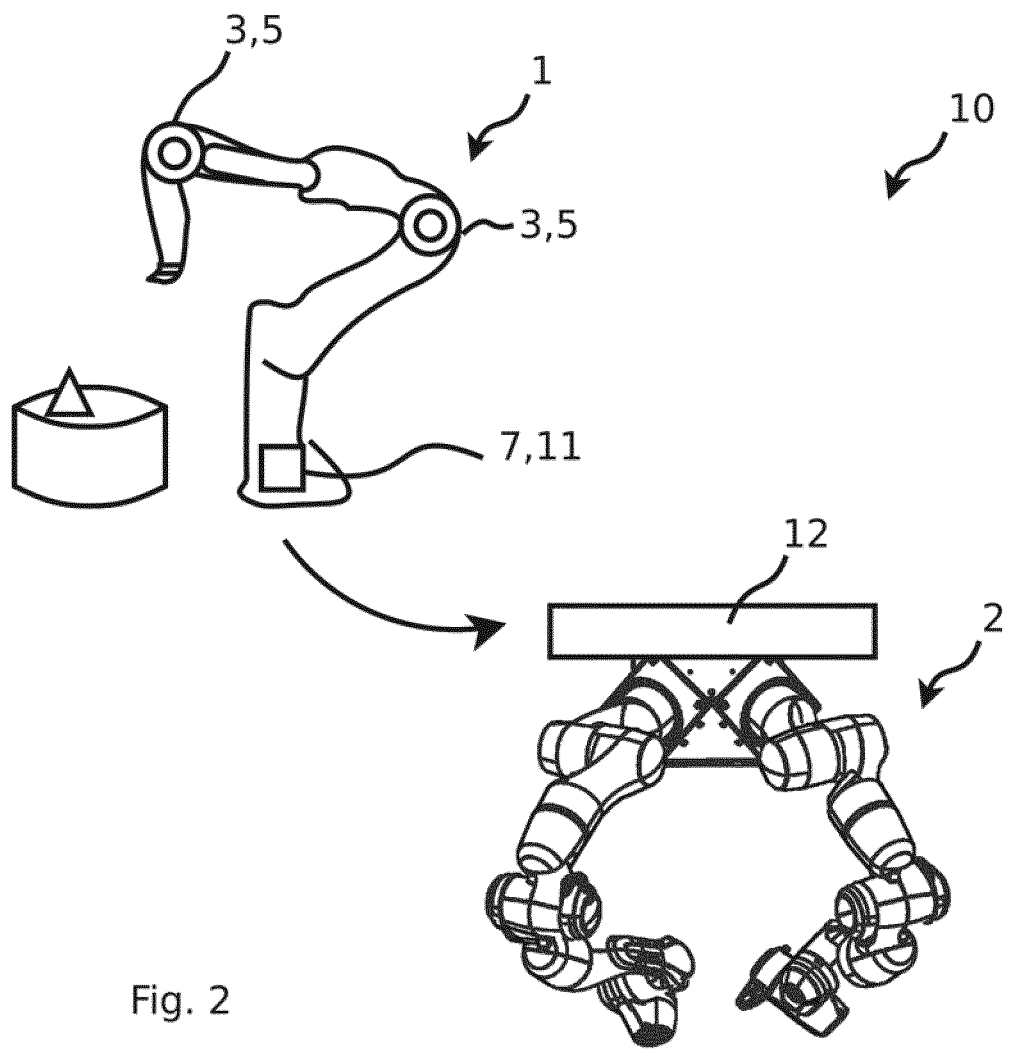
FIG. 2 shows a robot system for carrying out the method according to FIG. 1.

FIG. 2 shows a robot system 10 having a first control unit 11 and a second control unit 12, for generating a control program for a second robot manipulator 2 of the robot system 10 based on empirical data from executing a predetermined application by a first robot manipulator 1 of the robot system 10. In this case, the robot manipulator 1 is a conventional one-arm robot manipulator without redundant degrees of freedom. In contrast, the second robot manipulator 2 is a two-arm robot manipulator. The design conditions of the two robot manipulators 1, 2 therefore differ from each other. The first control unit 11 is arranged on the first robot manipulator 1 and is used to control the first robot manipulator 1 for the execution of the predetermined application, and to determine time series of trajectory data by joint angle sensors 3 of the first robot manipulator 1 and time series of wrench data by a sensor unit 5 of the first robot manipulator 1 during execution of the predetermined application, and to store the determined time series in a storage unit 7. Furthermore, the first control unit 11 determines the robot commands from the stored time series and stores these determined robot commands in the storage unit 7, which is part of the first control unit 11. The second control unit 12 is arranged on the second robot manipulator 2 and is used to generate the control program for the second robot manipulator 2 based on the stored robot commands and based on design conditions of the second robot manipulator 2.

Although the invention has been further illustrated and explained in detail by preferred embodiments, the invention is not limited by the disclosed examples and other variations may be derived therefrom by those skilled in the art without departing from the scope of protection sought for the invention. It is therefore clear that a wide variety of possible variations exist. It is also clear that example embodiments mentioned are really only examples, which are not to be understood in any way as limiting, for example, the scope of protection, the possible applications or the configuration of the invention. Rather, the foregoing description and the figure description enable the person skilled in the art to implement the example embodiments in a concrete manner, whereby the person skilled in the art, being aware of the disclosed idea of the invention, can make a variety of changes, for example with respect to the function or the arrangement of individual elements mentioned in an example embodiment, without leaving the scope of protection defined by the claims and their legal equivalents, such as further explanations in the description.

LIST OF REFERENCE NUMERALS

1 first robot manipulator
2 second robot manipulator
3 joint angle sensors
5 sensor unit
7 storage unit
10 robot system
11 first control unit
12 second control unit S1 executing
S2 determining
S3 determining
S4 generating

The invention claimed is:

1. A method of generating a control program for a second robot manipulator based on empirical data from executing a predetermined application by a first robot manipulator, the method comprising:
    executing the predetermined application by the first robot manipulator;
    during execution of the predetermined application: determining time series of trajectory data by joint angle sensors of the first robot manipulator and/or time series of wrench data by a sensor unit of the first robot manipulator for detecting forces and/or torques, and storing the determined time series in a storage unit, the trajectory data comprising kinematic data relating to a reference point of the first robot manipulator or relating to the joint angles of the first robot manipulator, and the wrench data comprising forces and/or torques acting between the first robot manipulator and an object in the surroundings;
    determining robot commands from the stored time series, and storing the determined robot commands in the storage unit, the robot commands being principal elements of a control program for a respective robot manipulator without reference to design conditions of the first robot manipulator; and
    generating the control program for the second robot manipulator based on the stored robot commands and based on design conditions of the second robot manipulator.

2. The method of claim 1, wherein the robot commands comprise at least one category of different categories comprising:
    a predetermined path curve of a reference point of the respective robot manipulator from a predetermined start point to a predetermined end point of the predetermined path curve;
    a velocity of the reference point on the predetermined path curve;
    an acceleration of the reference point on the predetermined path curve;
    a force and/or a torque that the reference point of the respective robot manipulator exerts on an object in the surroundings of the respective robot manipulator; and
    target torques for rotational actuators of the respective robot manipulator.

3. The method of claim 2, wherein the method comprises:
    determining at least two successive robot commands from the different categories; and
    determining a blending transition between the at least two successive robot commands from the different categories.

4. The method of claim 3, wherein the method further comprises performing the blending transition by a continuous, and over time of the blending transition, a time-dependent predetermined function course.

5. The method of claim 1, wherein the method further comprises performing nonlinear optimization in determination of the robot commands from the stored time series.

6. The method of claim 1, wherein in determination of the robot commands from the stored time series, the method further comprises:
    applying a predetermined artificial neural network, an input variable of the artificial neural network being the stored time series and an output variable of the artificial neural network being a respectively selected one of a plurality of structurally predetermined robot commands; and
adapting parameters of the respectively selected one of the predetermined robot commands based on the stored time series.

7. The method of claim 1, wherein determination of the time series of trajectory data is additionally performed by a camera unit.

8. The method of claim 7, wherein the camera unit is an external camera unit.

9. The method of claim 1, wherein the design conditions of the first robot manipulator and/or the design conditions of the second robot manipulator comprise at least one of the following:
   distances between joints of the respective robot manipulator;
   number of joints of the respective robot manipulator;
   maximum torque that is capable of being applied by rotational actuators of the respective robot manipulator;
   type and configuration of an end effector of the respective robot manipulator;
   virtual stiffness of a closed-loop control of the respective robot manipulator;
   material stiffness of links and/or joints of the respective robot manipulator;
   a geometrically maximum possible working space of the respective robot manipulator;
   time constants and/or bandwidths of actuators of the respective robot manipulator;
   safety level, and/or current safety configuration, and/or residual risk of the respective robot manipulator;
   physical existence and/or configuration of communication interfaces of the respective robot manipulator;
   number of robot arms of the respective robot manipulator; and
   mass and/or inertia of components, in particular links, of the respective robot manipulator.

10. A robot system to generate a control program for a second robot manipulator of the robot system based on empirical data from executing a predetermined application by a first robot manipulator of the robot system, the robot system comprising:
   a first control unit configured to:
      control the first robot manipulator to execute the predetermined application, and further designed to determine time series of trajectory data by joint angle sensors of the first robot manipulator and/or time series of wrench data by a sensor unit of the first robot manipulator during execution of the predetermined application and to store the determined time series in a storage unit, the trajectory data comprising kinematic data relating to a reference point of the first robot manipulator or relating to the joint angles of the first robot manipulator, the wrench data comprising forces and/or torques acting between the first robot manipulator and an object in the surroundings; and
      determine robot commands from the stored time series and to store the determined robot commands in the storage unit, the robot commands being principal elements of a control program for a respective robot manipulator without reference to design conditions of the first robot manipulator; and
   a second control unit configured to generate the control program for the second robot manipulator based on stored robot commands and based on design conditions of the second robot manipulator.

11. The robot system of claim 10, wherein the robot commands comprise at least one category of different categories comprising:
   a predetermined path curve of a reference point of the respective robot manipulator from a predetermined start point to a predetermined end point of the predetermined path curve;
   a velocity of the reference point on the predetermined path curve;
   an acceleration of the reference point on the predetermined path curve;
   a force and/or a torque that the reference point of the respective robot manipulator exerts on an object in the surroundings of the respective robot manipulator; and
   target torques for rotational actuators of the respective robot manipulator.

12. The robot system of claim 11, wherein the first control unit is further configured to:
   determine at least two successive robot commands from the different categories; and
   determine a blending transition between the at least two successive robot commands from the different categories.

13. The robot system of claim 12, wherein the first control unit is further configured to perform the blending transition by a continuous, and over time of the blending transition, a time-dependent predetermined function course.

14. The robot system of claim 10, wherein the first control unit is further configured to perform nonlinear optimization in determination of the robot commands from the stored time series.

15. The robot system of claim 10, wherein in determination of the robot commands from the stored time series, the first control unit is further configured to:
   apply a predetermined artificial neural network, an input variable of the artificial neural network being the stored time series and an output variable of the artificial neural network being a respectively selected one of a plurality of structurally predetermined robot commands; and
   adapt parameters of the respectively selected one of the predetermined robot commands based on the stored time series.

16. The robot system of claim 10, wherein determination of the time series of trajectory data is additionally performed by a camera unit.

17. The robot system of claim 16, wherein the camera unit is an external camera unit.

18. The robot system of claim 10, wherein the design conditions of the first robot manipulator and/or the design conditions of the second robot manipulator comprise at least one of the following:
   distances between joints of the respective robot manipulator;
   number of joints of the respective robot manipulator;
   maximum torque that is capable of being applied by rotational actuators of the respective robot manipulator;
   type and configuration of an end effector of the respective robot manipulator;
   virtual stiffness of a closed-loop control of the respective robot manipulator;
   material stiffness of links and/or joints of the respective robot manipulator;
   a geometrically maximum possible working space of the respective robot manipulator;

time constants and/or bandwidths of actuators of the respective robot manipulator;

safety level, and/or current safety configuration, and/or residual risk of the respective robot manipulator;

physical existence and/or configuration of communication interfaces of the respective robot manipulator;

number of robot arms of the respective robot manipulator; and mass and/or inertia of components, in particular links, of the respective robot manipulator.

* * * * *